United States Patent
Takayama

(10) Patent No.: US 9,118,836 B2
(45) Date of Patent: Aug. 25, 2015

(54) IMAGING DEVICE

(71) Applicant: Panasonic Corporation, Osaka (JP)

(72) Inventor: Koji Takayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/477,409

(22) Filed: Sep. 4, 2014

(65) Prior Publication Data

US 2015/0098001 A1    Apr. 9, 2015

(30) Foreign Application Priority Data

Oct. 8, 2013    (JP) .................................. 2013-210785
Aug. 29, 2014    (JP) .................................. 2014-175251

(51) Int. Cl.
*G03B 17/18*    (2006.01)
*H04N 5/232*    (2006.01)

(52) U.S. Cl.
CPC .................................. *H04N 5/23293* (2013.01)

(58) Field of Classification Search
CPC .................................................. H04N 5/23293
USPC ........................................................ 396/287
See application file for complete search history.

(56) References Cited

U.S. PATENT DOCUMENTS

| | | | | |
|---|---|---|---|---|
| 5,537,175 A | * | 7/1996 | Kamaya et al. | ............... 396/376 |
| 5,991,547 A | * | 11/1999 | Baiera et al. | ..................... 396/6 |
| 6,357,884 B1 | * | 3/2002 | Lonergan | ..................... 359/877 |
| 2002/0015592 A1 | * | 2/2002 | Kawamura et al. | ........... 396/323 |
| 2007/0291158 A1 | * | 12/2007 | Kuno et al. | .................... 348/362 |
| 2011/0134269 A1 | * | 6/2011 | Kim | ........................... 348/222.1 |
| 2012/0045196 A1 | * | 2/2012 | Takahashi et al. | ............ 396/374 |

FOREIGN PATENT DOCUMENTS

| | | | |
|---|---|---|---|
| JP | 09244136 A | * | 9/1997 |
| JP | 11-046316 A | | 2/1999 |
| JP | 2000-341560 A | | 12/2000 |

* cited by examiner

*Primary Examiner* — Rodney Fuller
(74) *Attorney, Agent, or Firm* — Renner, Otto, Boisselle & Sklar, LLP

(57) ABSTRACT

An imaging device which can more reliably guide eye lines of a subject to a lens even when the subject is a child or an infant is provided. The imaging device according to the present disclosure includes: an optical system; an imaging sensor which captures a subject image condensed by the optical system; a monitor which displays the captured subject image; and a controller which displays an on-screen display (OSD), which moves in a center direction of the optical system, on a display surface of the monitor oriented toward a subject before start of shooting a still image of a subject or during shooting of a moving image.

6 Claims, 10 Drawing Sheets

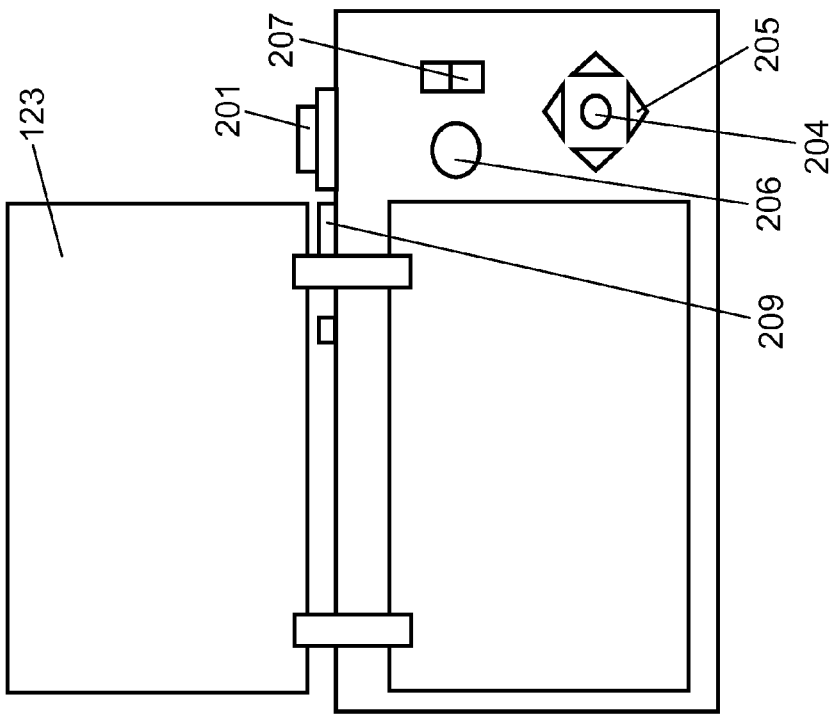
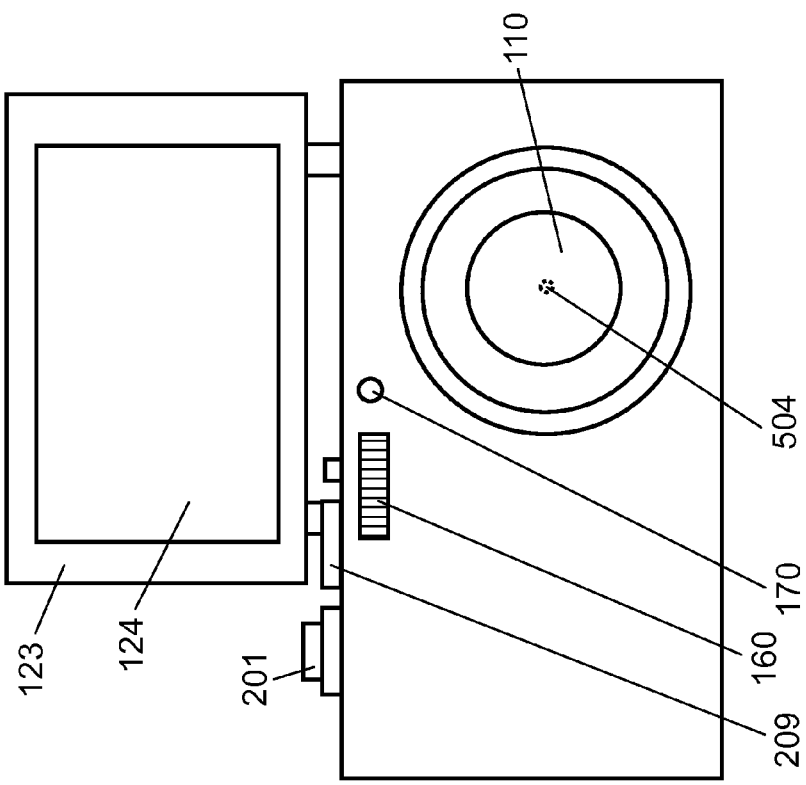
FIG. 3B
FIG. 3A

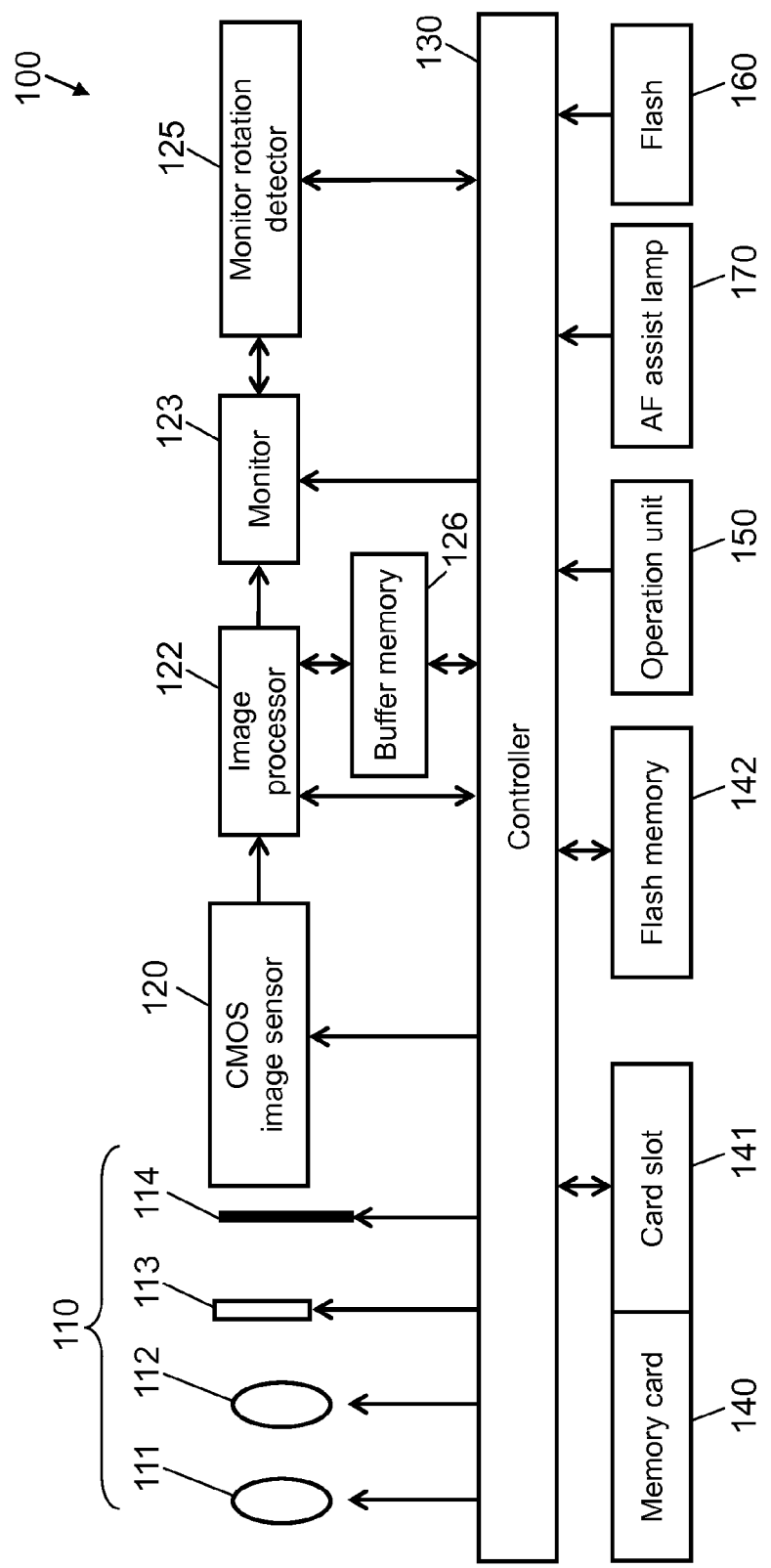

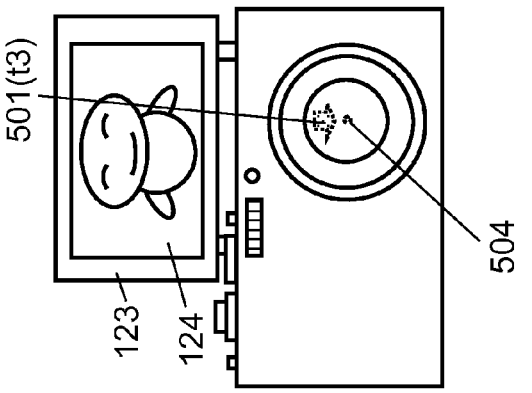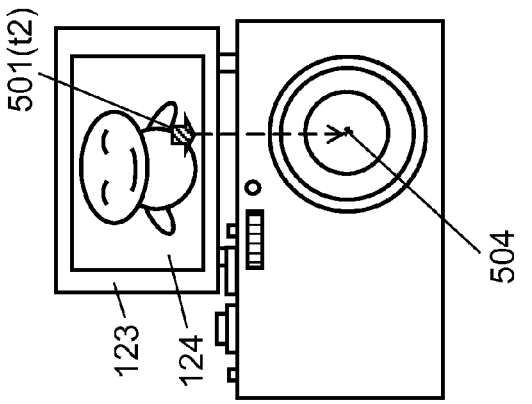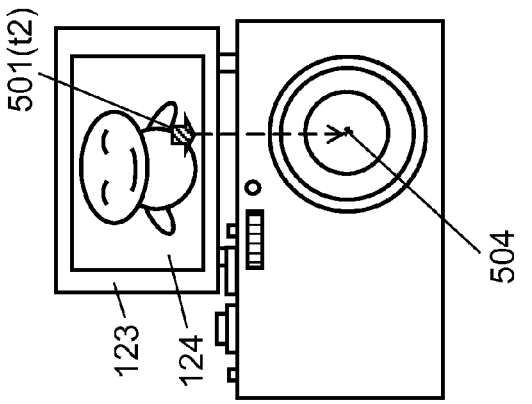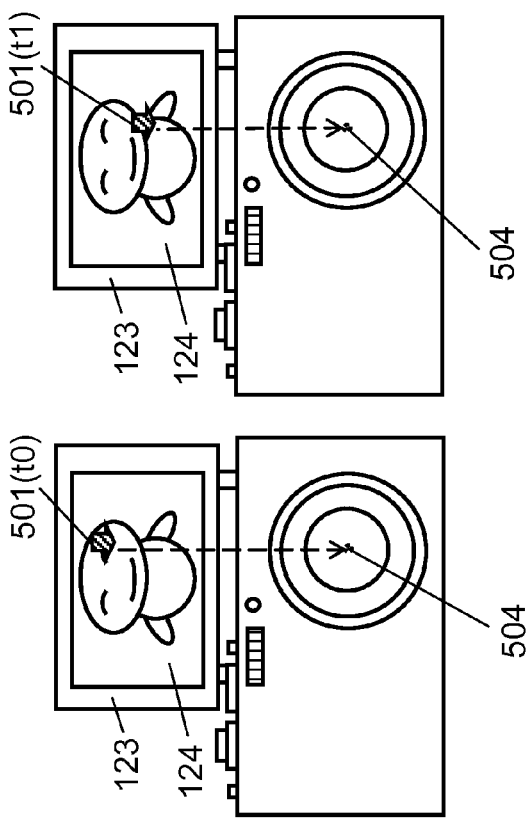

IMAGING DEVICE

BACKGROUND

1. Technical Field

The present disclosure relates to an imaging device which can shoot a subject image in a state where a display surface of a monitor is oriented toward a subject side.

2. Description of the Related Art

PTL 1 discloses a digital still camera or an imaging device for movies which can change an angle of a monitor for displaying captured image data and the like.

Features of PTL 1 lie in "displaying eye line correction indication 23 which encourages correction of an eye line direction of a subject, in an image displayed on liquid crystal display panel 2 in a video image shooting device which has liquid crystal display panel 2 which can display an image which is being shot while being oriented toward the subject".

CITATION LIST

Patent Literature

PTL 1: Unexamined Japanese Patent Publication No. 2000-341560

SUMMARY

PTL 1 does not consider that the subject is a child or an infant. The present disclosure provides an imaging device which can more reliably guide eye lines of a subject to a lens even when the subject is a child or an infant.

The imaging device according to the present disclosure includes: an optical system; an imaging sensor which captures a subject image condensed by the optical system; a monitor which displays the captured subject image; and a controller which displays an on-screen display (referred to as an "OSD" below), which moves in a center direction of the optical system, on a display surface of the monitor oriented toward a subject before start of shooting a still image of a subject or during shooting of a moving image.

Further, the present disclosure includes a technique of reducing occurrence of hand shake upon shooting in a state where the monitor is oriented toward the subject side.

The imaging device according to the present disclosure can more reliably guide eye lines of a subject to a lens even when the subject is a child or an infant.

BRIEF DESCRIPTION OF DRAWINGS

FIG. 3A is a front view illustrating a state where a monitor of the digital camera according to the first exemplary embodiment is opened;

FIG. 3B is a back view illustrating a state where the monitor of the digital camera according to the first exemplary embodiment is opened;

FIG. 4 is an electrical configuration diagram of the digital camera according to the first exemplary embodiment;

FIG. 6A is an explanatory view of a display example of an eye line guidance OSD at time t0 according to the first exemplary embodiment;

FIG. 6B is an explanatory view of a display example of the eye line guidance OSD at time t1 according to the first exemplary embodiment;

FIG. 6C is an explanatory view of a display example of the eye line guidance OSD at time t2 according to the first exemplary embodiment;

FIG. 6D is an explanatory view of a display example of the eye line guidance OSD at time t3 according to the first exemplary embodiment;

DETAILED DESCRIPTION OF THE PREFERRED EMBODIMENTS

Exemplary embodiments will be described in detail below optionally with reference to the drawings. However, in some cases, the exemplary embodiments will not be described in detail more than necessary. For example, in some cases, matters which have already been well known will not be described in detail, and substantially the same configurations will not be described again to prevent the following description from being redundant more than necessary and facilitate understanding of one of ordinary skill in the art.

In addition, the inventor provides the accompanying drawings and the following description to make it easy for one of ordinary skill in the art to sufficiently understand the present disclosure, and does not intend to limit the subject matters recited in the claims.

First Exemplary Embodiment

[1. Configuration of Digital Camera]

Figure 1:
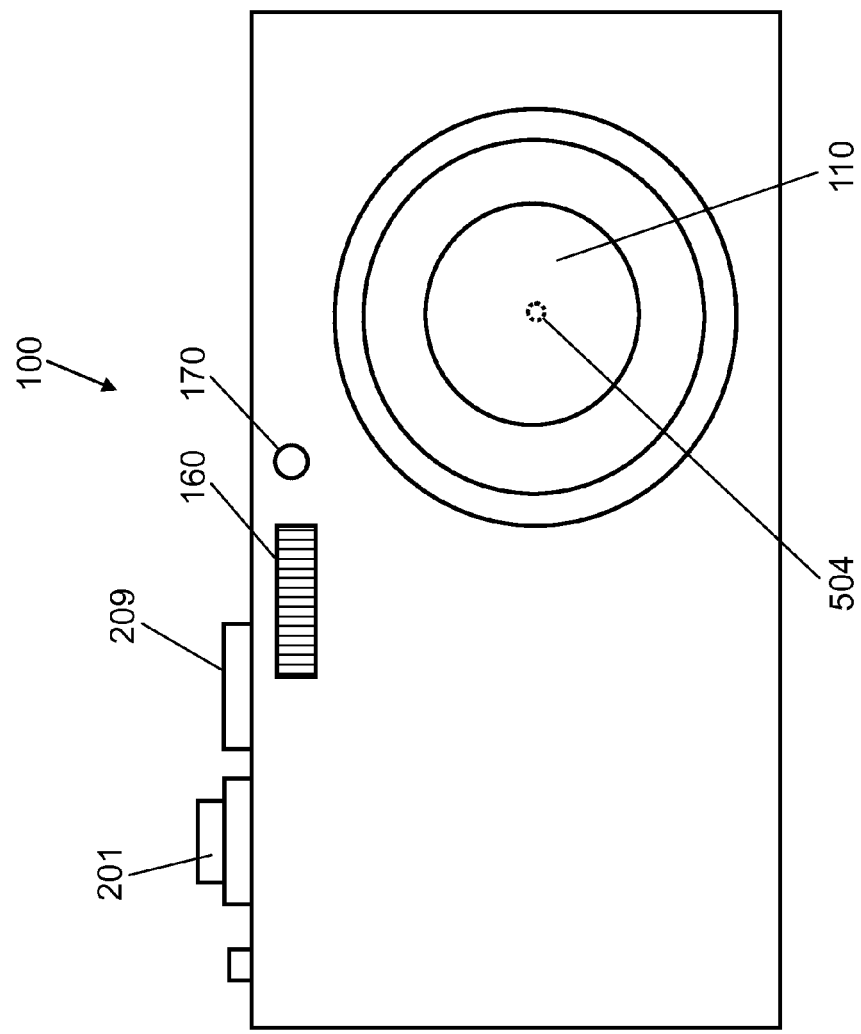
FIG. 1 is a front view of a digital camera according to a first exemplary embodiment.

FIG. 1 is a front view of digital camera 100. Digital camera 100 has a lens barrel in which optical system 110 is accommodated, flash 160 and auto focus assist lamp (AF assist lamp) 170 in a front surface. Further, digital camera 100 has operation buttons such as still image release button 201 in a top surface. Furthermore, digital camera 100 has scene switching dial 209 in the top surface. In addition, optical system 110 having a lens has optical system center 504 (optical axis) as illustrated in FIG. 1.

Figure 2:
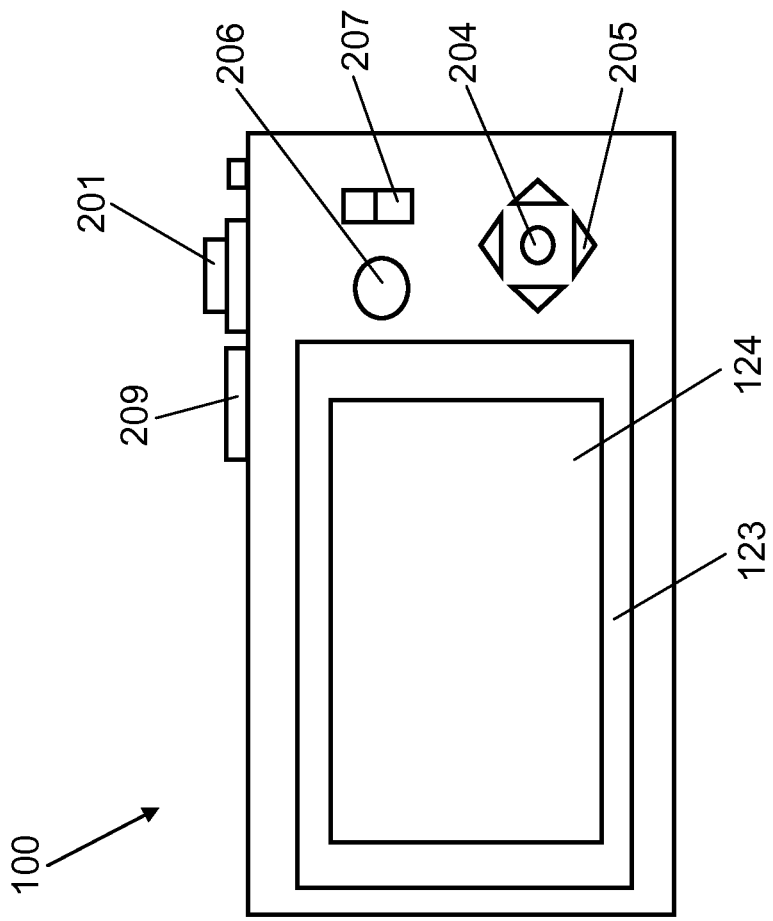
FIG. 2 is a back view of the digital camera according to the first exemplary embodiment.

FIG. 2 is a back view of digital camera 100. Digital camera 100 has vari-angle monitor 123, and operation buttons such as center button 204, cross button 205, moving image release button 206 and mode switching switch 207 in a back surface. In a state illustrated in FIG. 2, monitor 123 is closed toward the back surface side of digital camera 100, and is accommodated. Further, in the state illustrated in FIG. 2, display surface 124 of monitor 123 is oriented toward the back surface side of digital camera 100.

FIG. 3A is a front view illustrating a state where monitor 123 of digital camera 100 is opened. FIG. 3B is a back view illustrating a state where monitor 123 of digital camera 100 is opened. Monitor 123 is rotatable about a back surface side upper portion of digital camera 100. When a position at which monitor 123 illustrated in FIG. 2 is closed is 0 degrees, a state where monitor 123 illustrated in FIGS. 3A and 3B is opened is a state where monitor 123 rotates about 180 degrees. As illustrated in FIGS. 3A and 3B, display surface 124 is oriented toward a subject side in a state where monitor 123 is rotated 180 about degrees, is moved and is opened. That is, display surface 124 of monitor 123 is oriented toward the subject side similar to optical system 110.

FIG. 4 is an electrical configuration diagram of digital camera 100. Digital camera 100 captures a subject image formed through optical system 110 by using CMOS image sensor 120 (Complementary Metal-Oxide Semiconductor image sensor). CMOS image sensor 120 generates image data based on the captured subject image. The image data generated by capturing the image is subjected to various processing in image processor 122. The generated image data is recorded in a recording medium such as flash memory 142 and memory card 140. CMOS image sensor 120 is an example of an imaging sensor. Instead of CMOS image sensor 120, an imaging sensor such as a CCD (Charge Coupled Device) image sensor can also be used.

Optical system 110 has focus lens 111, zoom lens 112, aperture 113 and shutter 114. Focus lens 111, zoom lens 112, aperture 113 and shutter 114 are driven by driving means such as a DC motor and a stepping motor corresponding to focus lens 111, zoom lens 112, aperture 113 and shutter 114, respectively, according to control signals notified from controller 130.

CMOS image sensor 120 captures a subject image formed through optical system 110, and generates image data. CMOS image sensor 120 captures image data under control of controller 130. Further, CMOS image sensor 120 outputs the captured image data to image processor 122.

Image processor 122 performs various processing to the image data. The various processing includes, for example, white balance correction, gamma correction, YC conversion processing, electronic zoom processing, compression processing, and expansion processing. The various processing may include processing other than these processing. Image processor 122 stores image information subjected to the various processing, in buffer memory 126. Image processor 122 may be configured as a hard-wired electronic circuit. Further, image processor 122 may be configured as a micro computer using programs. Furthermore, together with controller 130, image processor 122 may be configured using one semiconductor chip.

Monitor 123 is provided in the back surface of digital camera 100. Monitor 123 is the vari-angle monitor. Vari-angle monitor 123 is configured to be capable of changing the orientation of display surface 124 of vari-angle monitor 123. Vari-angle monitor 123 is openable and rotatable with respect to a main body of display surface 124 of vari-angle monitor 123. Consequently, it is possible to continuously change the orientation of display surface 124 of monitor 123 from the back surface side to the front surface side of digital camera 100. As described above, monitor 123 is at a position of 0 degrees in a closed state illustrated in FIG. 2. Monitor 123 is at a position of about 180 degrees in an opened state illustrated in FIGS. 3A and 3B. Further, when monitor 123 is stopped at a position of about 90 degrees, display surface 124 is oriented toward a top surface side.

Monitor 123 displays images based on image data processed by image processor 122. The images displayed on monitor 123 include through images and recorded images. A through image is a series of items of image data sequentially generated in real time by CMOS image sensor 120. Digital camera 100 displays through images on monitor 123 in a shooting mode. A user can shoot an image while checking a composition of a subject while referring to a through image displayed on monitor 123. A recorded image is a shot image recorded in memory card 140 or the like.

Monitor rotation detector 125 detects a rotation angle (rotation state) of monitor 123, and notifies a detection result to controller 130. Controller 130 determines whether display surface 124 of monitor 123 is oriented toward the subject side (in an opened state) or is oriented toward the back surface side (in a closed state) based on a detection result.

Controller 130 controls an entire operation of digital camera 100. Further, controller 130 records image data stored in buffer memory 126, in memory card 140 after finishing processing of image processor 122. Controller 130 is configured to include a ROM (Read Only Memory) which stores programs, and a central processing unit (CPU) which processes various pieces of information by executing the programs. The ROM stores programs related to file control, auto focus control (AF control), auto exposure control (AE control) and light emission control of flash 160 and, in addition, a program for controlling an entire operation of digital camera 100.

Controller 130 may be configured as a hard-wired electronic circuit, and a micro computer. Further, together with image processor 122, controller 130 may be configured using one semiconductor chip. Furthermore, the ROM may not be an internal configuration of controller 130, and may be provided outside controller 130.

Buffer memory 126 is storage means which functions as a working memory of image processor 122 and controller 130. Buffer memory 126 can be realized by a DRAM (Dynamic Random Access Memory) or the like. Further, flash memory 142 functions as an internal memory which records image data and setting information of digital camera 100 and the like.

Card slot 141 is connection means to which memory card 140 is detachable. Card slot 141 can be electrically or mechanically connected with memory card 140. Further, card slot 141 may have a function of controlling memory card 140.

Memory card 140 is an external memory which has a recording unit such as a flash memory inside. In memory card 140, image data processed in image processor 122 can be recorded.

Operation unit 150 is an inclusive term of operation buttons and operation dials provided to an exterior of digital camera 100, and receives a user's operation. As illustrated in, for example, FIGS. 1 and 2, still image release button 201, moving image release button 206, center button 204, cross button 205, mode switching switch 207, and scene switching dial 209 correspond to operation unit 150. When receiving a user's operation, operation unit 150 notifies various operation command signals to controller 130.

Still image release button 201 is a two-step push button of a half-push state and a full-push state. When the user half-pushes still image release button 201, controller 130 executes AF control and AE control, and determines shooting conditions. Next, when the user full-pushes still image release button 201, controller 130 performs shooting processing. Controller 130 records image data captured at a timing of full-pushing as a still image in memory card 140 or the like. When it is simply described that still image release button 201 is pushed, this means full-pushing.

Moving image release button 206 is a push button for commanding start/end of moving image recording. When the user pushes moving image release button 206, controller 130 continuously records image data generated by image processor 122 as a moving image in a recording medium such as memory card 140 or the like based on the image data generated by CMOS image sensor 120. When moving image release button 206 is pushed again, recording of moving images is finished.

Center button 204 is a push button. When digital camera 100 is in a shooting mode or in a playback mode and when center button 204 is pushed by the user, controller 130 displays a menu screen on monitor 123. The menu screen is a screen for setting various conditions for shooting/playback. Information set on the menu screen is recorded in flash memory 142. When setting items of the various conditions are selected, if center button 204 is pushed, center button 204 also functions as a determination button.

Cross button 205 is a push button provided in upper, lower, left and right directions. The user can select various condition items displayed on monitor 123 by pushing cross button 205 in one of the upper, lower, left and right directions.

Mode switching button 207 is a push button provided in upper and lower directions. The user can switch the state of digital camera 100 to the shooting mode or the playback mode by pushing mode switching switch 207 in one of the upper and lower directions.

Scene switching dial 209 is a dial for switching a scene mode. A scene mode is an inclusive term set according to a shooting situation. One scene mode is set from a plurality of scene modes by switching scene switching dial 209. The plurality of scene modes includes, for example, a landscape mode, a person mode, a night scene mode, a backlight mode, a macro mode and an auto scene determination mode. In addition, in the auto scene determination mode, for example, one of the landscape mode, the person mode, the night scene mode, the backlight mode and the macro mode is automatically set based on image data.

[2. Shooting Operation]

Figure 5:
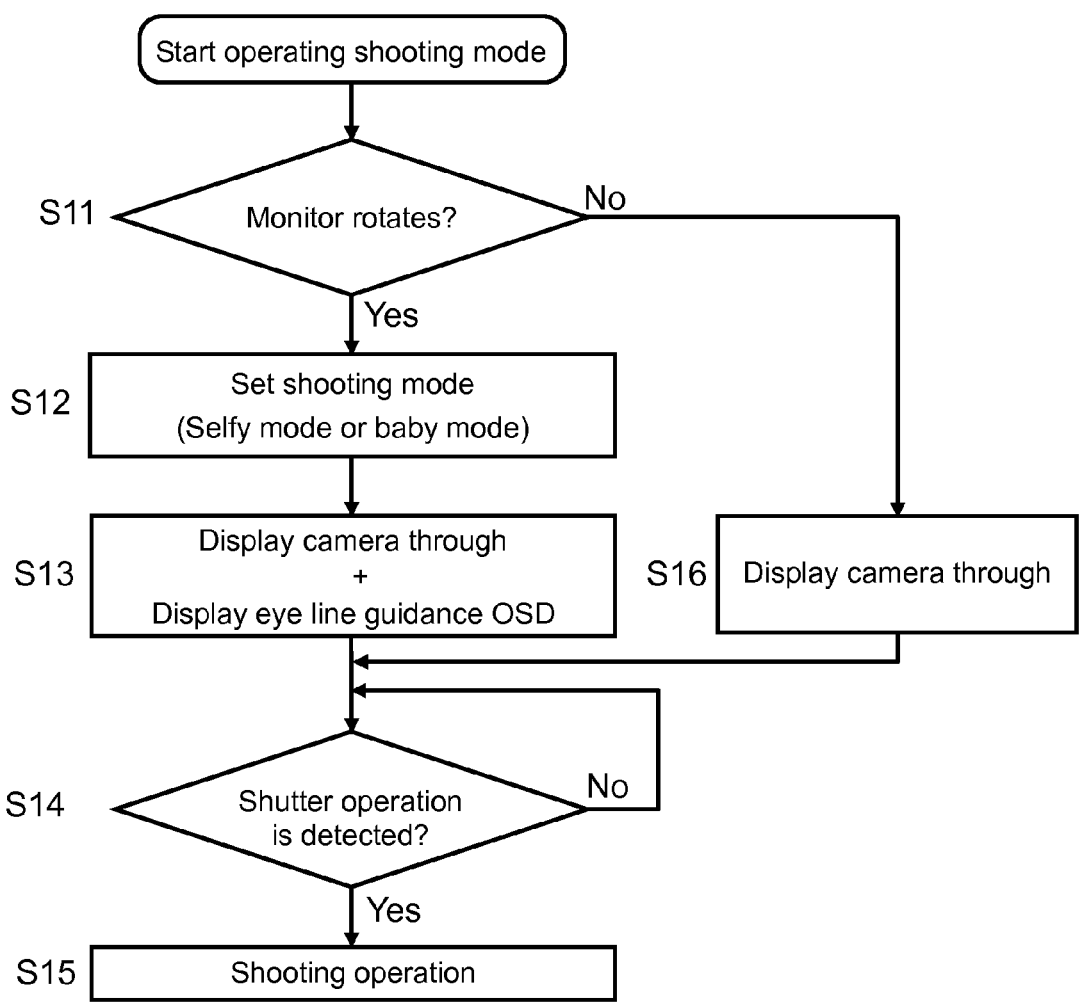
FIG. 5 is a flowchart illustrating processing of a shooting operation according to the first exemplary embodiment.

FIG. 5 is a flowchart illustrating processing of a shooting operation. Controller 130 obtains rotation information of monitor 123 from monitor rotation detector 125, and determines whether or not monitor 123 rotates (S11). In this regard, as illustrated in FIG. 2, a state where display surface 124 of monitor 123 is oriented toward the back surface side is set to 0 degrees as a rotation angle. For example, controller 130 determines that monitor 123 rotates (Yes in S11) when the rotation angle of monitor 123 is 170 degrees or more, and determines that monitor 123 does not rotate (No in S11) when the rotation angle of monitor 123 is less than 170 degrees. When, for example, the rotation angle of monitor 123 is about 90 degrees, display surface 124 of monitor 123 is oriented upward and is in a state which is suitable for low angle shooting. In this state, the rotation angle of monitor 123 is less than 170 degrees, and it is determined in step S11 that monitor 123 does not rotate (No in S11). Further, when monitor 123 rotates at a view angle of monitor 123 or more, monitor 123 is in a state which is not suitable for low angle shooting. In the present exemplary embodiment, when the rotation angle of monitor 123 is 170 degrees or more, it is determined that monitor 123 is not in a state which is suitable for low angle shooting and rotates.

When it is determined in step S11 that monitor 123 rotates (Yes in S11), image processor 122 changes the shooting mode to a setting such as a "selfy mode" or "baby mode" for obtaining image quality assuming a subject as a person (S12).

When the shooting mode is set to the "selfy mode" or the "baby mode" for obtaining image quality assuming a subject as a person in step S12, an OSD which guides eye lines is superimposed on an indication of a camera through (through image) and is simultaneously displayed on monitor 123 (S13). In this regard, the OSD means an On Screen Display, and includes an arbitrary information display function displayed on a screen and is an indication of a character or a symbol. In the present exemplary embodiment, an OSD which is superimposed on an image captured by CMOS image sensor 120 through optical system 110, and which has a function of guiding eye lines of a person who is a subject, to optical system center 504 is displayed on display surface 124 of monitor 123.

Hereinafter, an indication of the OSD which guides eye lines will be described. FIGS. 6A to 6D are explanatory views of display examples of eye line guidance OSD 501, and illustrate movement of eye line guidance OSD 501 as time passes from time t0 to time t3. FIGS. 6A, 6B, 6C and 6D illustrate the display examples of eye line guidance OSD 501 at time t0, time t1, time t2 and time t3, respectively. Eye line guidance OSD 501 which is an OSD for guiding eye lines is, for example, an arrow figure indicating a direction. In addition, FIG. 6D means a state in which the indication of eye line guidance OSD 501 disappears from display surface 124 of monitor 123 at time t3.

As illustrated in FIG. 6A, at time t0, eye line guidance OSD 501 is superimposed on an indication of a camera through and is displayed at an upper portion of display surface 124 of monitor 123. Next, eye line guidance OSD 501 moves toward optical system center 504, and is displayed above optical center system 504 and near the center of display surface 124 at time t1 after a certain period of time passes (FIG. 6B). Further, as time passes, eye line guidance OSD 501 moves toward optical system center 504, and is displayed at a lower portion of display surface 124 at time t2 (FIG. 6C). When time passes more, eye line guidance OSD 501 is displayed at a display position (t0) illustrated in FIG. 6A, i.e., at an upper portion of display surface 124. The indication of eye line guidance OSD 501 displayed on monitor 123 guides eye lines of a person who is a subject to optical system center 504 by repeating the states illustrated in FIGS. 6A to 6C.

Further, when the eye lines are guided and are oriented toward optical system center 504, and still image release button 201 or moving image release button 206 is pushed at a shutter timing intended by the user, an image at this timing is captured.

Back to FIG. 5, in step S14, controller 130 detects whether or not a shutter operation is performed by pushing still image release button 201 or moving image release button 206.

When the shutter operation is detected in step S14, an image is captured in step S15. That is, CMOS image sensor 120 is exposed through optical system 110, and image data output from CMOS image sensor 120 is stored in the memory or the like.

In addition, when it is determined in step S11 that monitor 123 does not rotate (No in S11), controller 130 sets the shooting mode set by the user, and then displays a camera through on monitor 123 without displaying eye line guidance OSD 501 (S16).

In addition, a start position of eye line guidance OSD 501 (a display position of eye line guidance OSD 501 at t0) is not limited in particular. For example, eye line guidance OSD 501 may be displayed at an upper left portion of display surface 124 of monitor 123 when seen from the front surface of digital camera 100, and may be moved in a lower right direction toward optical system center 504 from the upper left portion as time passes.

Further, a display method and a movement trajectory of eye line guidance OSD 501 are not limited in particular. Eye line guidance OSD 501 can also be displayed as an icon or a character in addition to a figure indicating a direction, and only needs to be an indication which moves in a direction toward optical system center 504 as time passes. Further, a display method and a moving speed of eye line guidance OSD 501 can be optionally set as the user desires.

Figure 7:
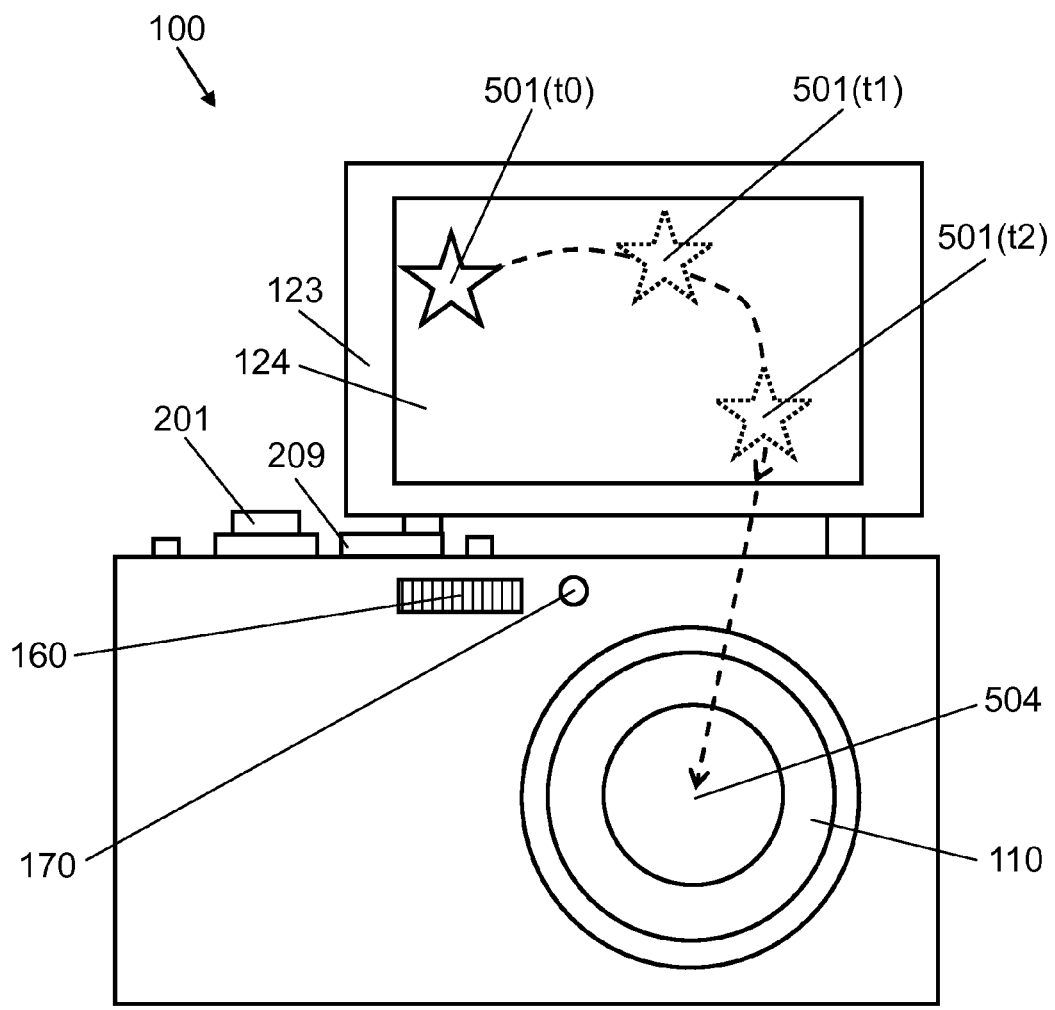
FIG. 7 is an explanatory view of another display example of the eye line guidance OSD according to the first exemplary embodiment.

FIG. 7 is an explanatory view of another display example of eye line guidance OSD 501. FIG. 7 illustrates eye line guidance OSD 501 as a star. Further, a movement trajectory of eye line guidance OSD 501 moves toward optical system center 504 drawing a curve instead of a linear line. Eye line guidance OSD 501 illustrated in FIG. 7 moves in order of t0→t1→t2 as time passes.

Figure 8:
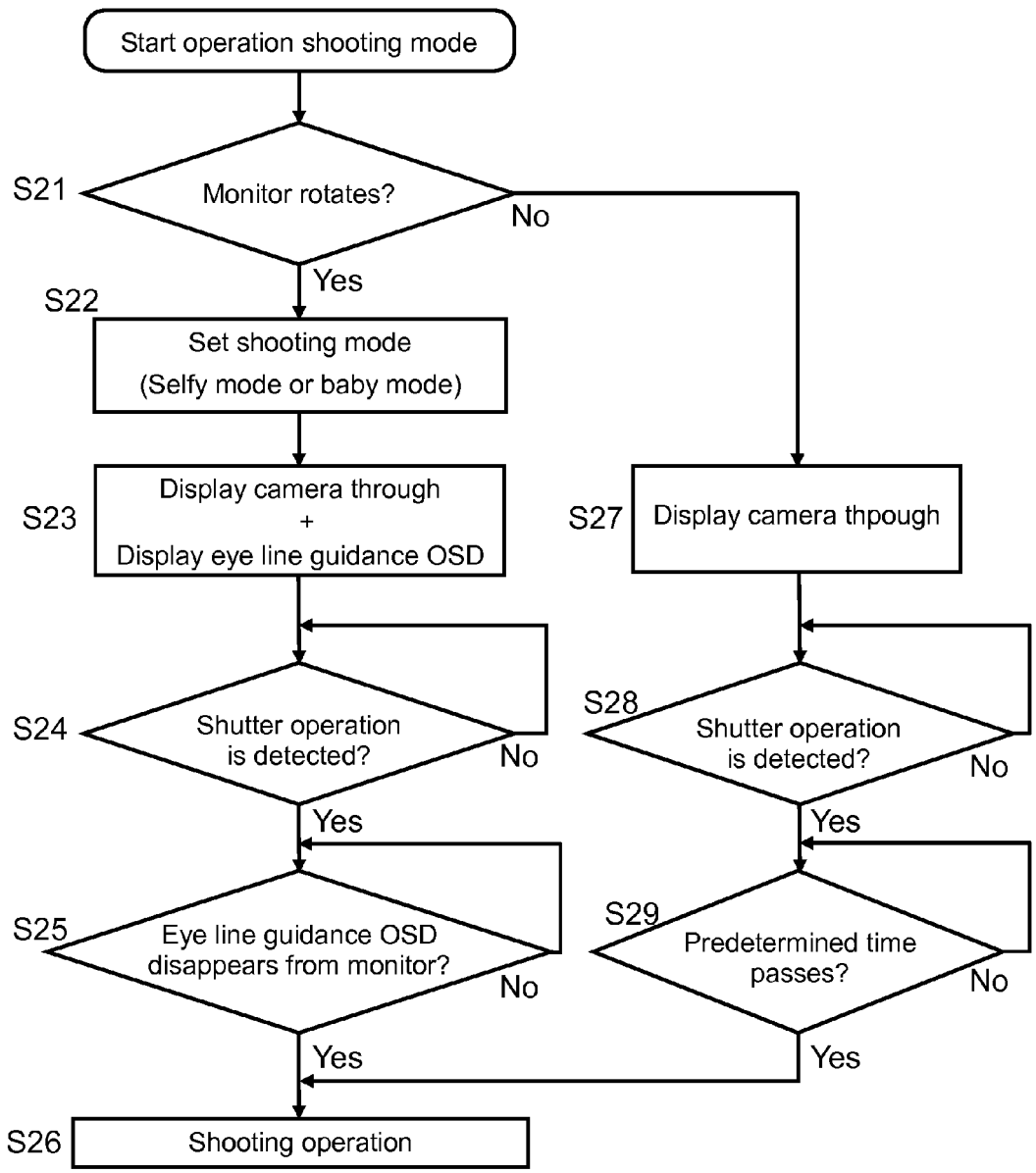
FIG. 8 is a flowchart illustrating processing of a shooting operation upon use of a self-timer according to the first exemplary embodiment.

Next, an operation in a case where a self-timer is set will be described. FIG. 8 is a flowchart illustrating processing of a shooting operation upon use of a self-timer. Steps S21 to S24 illustrated in FIG. 8 correspond to steps S11 to S14 illustrated in FIG. 5, respectively.

Steps S26 and S27 illustrated in FIG. 8 correspond to steps S15 and S16 illustrated in FIG. 5, respectively.

When it is determined in step S21 illustrated in FIG. 8 that monitor 123 rotates (Yes in S21), steps S22 to S24 are the same as steps S12 to S14 illustrated in the above described FIG. 5. Further, when the shutter operation is detected in step S24, the shooting operation is performed (S26) after displayed eye line guidance OSD 501 disappears from the monitor (S25). That is, CMOS image sensor 120 is exposed through optical system 110 similar to step S15 illustrated in FIG. 5, and image data output from CMOS image sensor 120 is stored in the memory or the like.

FIG. 6D illustrates a state (t3) where eye line guidance OSD 501 disappears from monitor 123 in step S25 illustrated in FIG. 8. That is, when the indication of eye line guidance OSD 501 disappears, after eye line guidance OSD 501 is displayed on monitor 123 in step S23 illustrated in FIG. 8, and eye line guidance OSD 501 changes states in order of t0→t1→t2 as illustrated in FIGS. 6A to 6C, the shooting operation is performed.

In addition, the indication of eye line guidance OSD 501 may transition to the state (t3) illustrated in FIG. 6D after the states of t0→t1→t2 illustrated in FIGS. 6A to 6C are repeated a predetermined number of times.

Further, when it is determined in step S21 illustrated in FIG. 8 that monitor 123 does not rotate (No in S21), controller 130 sets the shooting mode set by the user, and then displays a camera through similar to the case in FIG. 5 (S27). Furthermore, similar to known shooting which uses a self-timer, when the shutter operation is detected in step S28, the shooting operation is performed (S26) after a predetermined set time of the self-timer passes (S29).

As described above, the eye lines are guided to optical system center 504 by an operation of displaying eye line guidance OSD 501 without displaying words. Consequently, it is possible to move the eye lines in a direction indicated by eye line guidance OSD 501 even when a subject is a baby or an infant who cannot understand the meaning of words. Consequently, digital camera 100 can take pictures which catch eye lines of subjects.

Second Exemplary Embodiment

[1. Automatic Shooting using AF Assist Lamp]

Figure 9:
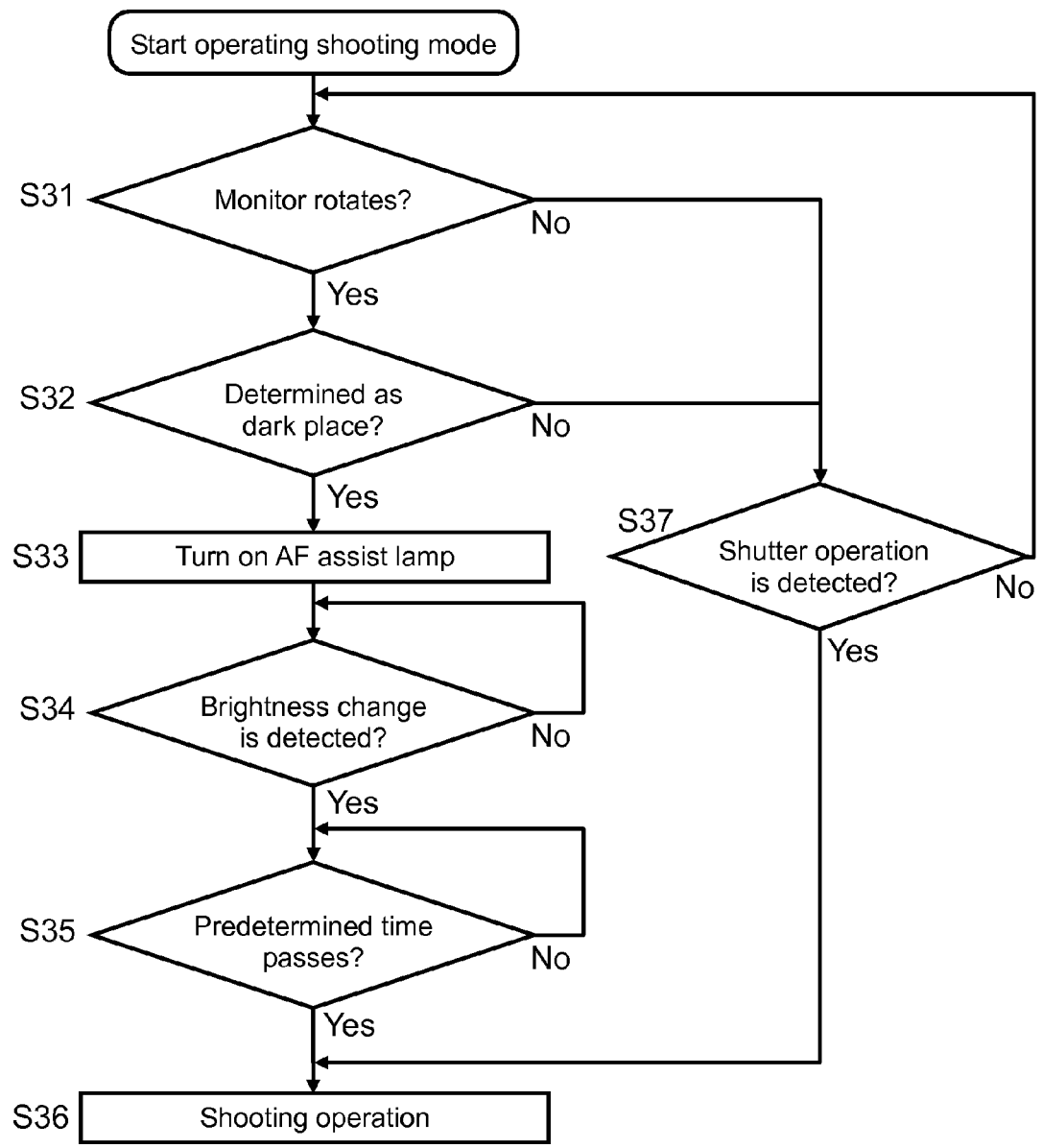
FIG. 9 is a flowchart illustrating processing of a shooting operation according to a second exemplary embodiment.

Next, a shooting operation according to the second exemplary embodiment will be described. FIG. 9 is a flowchart illustrating processing of the shooting operation according to the second exemplary embodiment. Automatic shooting using AF assist lamp 170 will be described in the second exemplary embodiment.

When a shooting mode operation starts, in step S31, controller 130 first obtains rotation information of monitor 123 from monitor rotation detector 125, and determines whether or not monitor 123 rotates. In this case, similar to the above first exemplary embodiment, when a rotation angle of monitor 123 is 170 degrees or more, it is determined that monitor 123 rotates.

When it is determined in step S31 that monitor 123 rotates (Yes in S31), controller 130 determines whether or not shooting environment is a dark place (S32).

Whether or not the shooting environment is a dark place is determined according to whether or not an output signal level is a level which enables AF control based on a level of a signal output from CMOS image sensor 120 when, for example, light from optical system 110 is blocked. Further, when the output signal level of CMOS image sensor 120 is a level which does not enable AF control, it is determined that the shooting environment is a dark place (Yes in S32) and, when the output signal level is a level which enables AF control, it is determined that the shooting environment is not a dark place (No in S32).

When it is determined in step S32 that the shooting environment is a dark place (Yes in S32), controller 130 turns on AF assist lamp 170 (S33).

When AF assist lamp 170 is turned on in step S33, controller 130 starts sampling the output signal level of CMOS image sensor 120, and detects a brightness change (S34). An enter of reflected light of AF assist lamp 170 into CMOS image sensor 120 prompts CMOS image sensor 120 to output an output signal. When, for example, a person who is a subject places the hand in front of optical system 110, light emitted from AF assist lamp 170 is reflected by the palm of the hand and is incident on optical system 110. When the person stops placing the hand, light reflected by the palm of the hand stops being incident on optical system 110, the output signal level of CMOS image sensor 120 lowers and brightness changes. When it is detected in step S34 in the second exemplary embodiment that the signal level lowers 6 dB or more, it is determined that the brightness changes (Yes in S34). In addition, when a threshold for detecting a brightness change can be optionally set and when, for example, it is detected that the level rises 6 dB or more, it may be determined that the brightness changes. When it is detected that the signal level lowers a predetermined threshold or more, it is determined that the brightness changes in order to shoot a stable posture after the person who is the subject lowers the hand since the shooting operation is triggered by the brightness change as described below.

In addition, the brightness change is detected according to reflected light of AF assist lamp 170 in the present exemplary embodiment. However, AF assist lamp 170 is an example of an assist light source (illuminating means which emits light different from light of a flash), and illuminating means other than AF assist lamp 170 may be provided. Further, an example of a shooting operation at a dark place which is shooting environment in which AF control cannot be performed has been described in the present exemplary embodiment. The present exemplary embodiment can be carried out in environment of such a dark place that a brightness change can be detected according to reflected light of an assist light source, that is, in environment in which other illuminating means is used instead of AF assist lamp 170.

Furthermore, when a brightness change is not detected (No in S34), controller 130 continues detecting whether or not the brightness changes, and does not transition to step S35 until the brightness change is detected.

When the brightness change is detected in step S34 (Yes in S34), controller 130 waits for a predetermined time to pass (S35), and transitions to step S36. That is, when the predetermined time passes in step S35 (Yes in S35), controller 130 automatically starts the shooting operation (S36). That is, CMOS image sensor 120 is exposed through optical system 110, and image data output from CMOS image sensor 120 is stored in the memory or the like.

Back to step S31, when it is determined that monitor 123 does not rotate (No in S31), controller 130 detects whether or not the shutter operation is performed at a shutter timing of still image release button 201 or the like intended by a user (S37).

Further, when the shooting environment is not a dark place in step S32 (No in S32), controller 130 detects whether or not the shutter operation is performed at a shutter timing of still image release button 201 or the like intended by the user (S37).

When the shutter operation is detected in step S37 (Yes in S37), controller 130 proceeds to step S36 and performs the shooting operation.

In addition, when the shutter operation is not detected in step S37 (No in S37), controller 130 returns to step S31, obtains rotation information of monitor 123 from monitor rotation detector 125 and determines whether or not monitor 123 rotates (S31).

[2. Automatic Shooting using AF Assist Lamp and Eye Line Guidance OSD]

Figure 10:
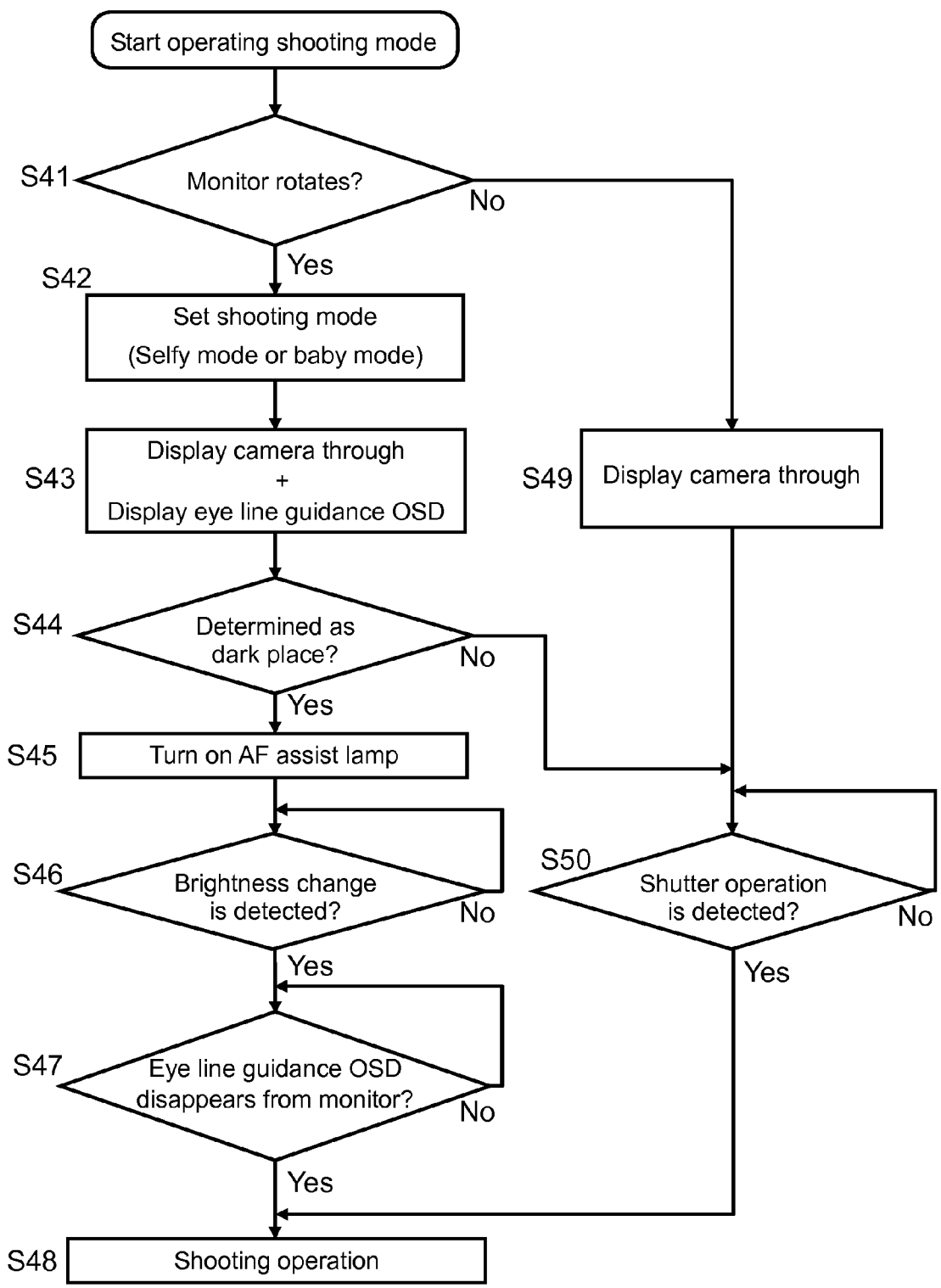
FIG. 10 is a flowchart illustrating processing of a shooting operation using an eye line guidance OSD according to the second exemplary embodiment.

Next, automatic shooting using eye line guidance OSD 501 together with AF assist lamp 170 will be described. FIG. 10 is a flowchart illustrating processing of a shooting operation using eye line guidance OSD 501 according to the second exemplary embodiment.

Steps S41 to S43 illustrated in FIG. 10 are the same as steps S11 to S13 illustrated in FIG. 5 and steps S21 to S23 illustrated in FIG. 8 in the first exemplary embodiment.

Further, controller 130 proceeds to step S44 illustrated in FIG. 10, and determines whether or not shooting environment is a dark place. In step S44, whether or not the shooting environment is a dark place is determined similar to step S32 illustrated in FIG. 9.

When it is determined in step S44 that the shooting environment is a dark place (Yes in S44), controller 130 turns on AF assist lamp 170 (S45). Step S45 corresponds to step S33 illustrated in FIG. 9.

When AF assist lamp 170 is turned on in step S45, controller 130 starts sampling the output signal level of CMOS image sensor 120, and detects a brightness change (S46). In step S46, the brightness change is detected similar to step S34 illustrated in FIG. 9.

Further, when the brightness change is detected in step S46 (Yes in S46), the shooting operation is performed (S48) after displayed eye line guidance OSD 501 disappears from the monitor (S47). A state where eye line guidance OSD 501 disappears from monitor 123 is a state (t3) illustrated in FIG. 6D as described in the first exemplary embodiment. That is, when the indication of eye line guidance OSD 501 disappears, after eye line guidance OSD 501 is displayed on monitor 123 in step S43 illustrated in FIG. 10, and eye line guidance OSD 501 changes states in order of t0→t1→t2 as illustrated in FIGS. 6A to 6C, the shooting operation is performed. In the shooting operation, CMOS image sensor 120 is exposed through optical system 110 similar to step S15 illustrated in FIG. 5 in the first exemplary embodiment, and image data output from CMOS image sensor 120 is stored in the memory or the like.

In addition, similar to the description in the first exemplary embodiment, the indication of eye line guidance OSD 501 may transition to the state (t3) illustrated in FIG. 6D after the states of t0→t1→t2 illustrated in FIGS. 6A to 6C are repeated a predetermined number of times.

Back to step S41 illustrated in FIG. 10, when it is determined that monitor 123 does not rotate (No in S41), similar to step S16 illustrated in FIG. 5, controller 130 sets the shooting mode set by the user, then displays a camera through without displaying eye line guidance OSD 501 on display surface 124 (S49) and proceeds to step S50.

Further, when the shooting environment is not a dark place in step S44 (No in S44), controller 130 proceeds to step S50, and detects whether or not the shutter operation is performed at a shutter timing of still image release button 201 intended by the user (S50).

When the shutter operation is detected in step S50 (Yes in S50), controller 130 proceeds to step S48 and performs the shooting operation.

[3. Effect Provided by Automatic Shooting using AF Assist Lamp]

As described above, in the second exemplary embodiment, when detecting rotation of monitor 123, digital camera 100 turns on the AF assist lamp. Further, when detecting a predetermined brightness change of reflected light of the AF assist lamp, digital camera 100 starts a shooting operation assuming that a shutter operation is performed similar to the case where the shutter operation is detected.

Consequently, digital camera 100 can activate a shutter operation by a non-contact operation of a user such as an operation of placing the hand in front of a lens. Further, it is possible to suppress of occurrence of misalignment of a composition such as vertical shaking due to a shutter operation resulting from pushing of still image release button 201 or the like.

Further, by displaying an OSD which guides eye lines to optical system center 504, on a monitor display surface in addition to automatic shooting using AF assist lamp 170, for example, a mother can cause a camera to perform a shooting operation at a posture holding a baby without directly touching a camera body, and can easily take pictures which catch eye lines of subjects.

Other Exemplary Embodiments

As described above, the exemplary embodiments have been described as an exemplary technique disclosed in the present application. However, the technique according to the present disclosure is not limited to this, and is also applicable to exemplary embodiments which are optionally changed, replaced, added and omitted. Further, each component described in the above exemplary embodiments can also be combined to provide new exemplary embodiments.

As described above, the exemplary embodiments have been described as an exemplary technique according to the present disclosure. Therefore, the accompanying drawings and the detailed description have been provided.

The present exemplary embodiment has been described using digital camera 100 which has a vari-angle monitor as an example. However, the other exemplary embodiments are not limited to this. Any configuration may be employed as long as display surface 124 of a monitor is oriented toward a subject side. For example, the monitor may be fixed like a smartphone. In this case, an optical system of a camera module is, for example, arranged outside display surface 124 of the monitor. Hence, a camera module is preferably provided rotatably with respect to a body. Further, an optical system is further provided in the same plane as the plane of display surface 124 of the monitor. Alternatively, a sub display or the like for displaying OSD 501 is preferably provided in a back surface of the smartphone.

Further, in the present exemplary embodiment, eye line guidance OSD 501 is moved to guide eye lines of a user. In the other exemplary embodiments, sound may be added in addition to eye line guidance OSD 501. In this case, as eye line guidance OSD 501 comes close to a center of the optical system, a musical pitch may be raised.

Further, an indication of eye line guidance OSD 501 is not limited to before shooting of a still image and may be displayed during shooting of moving images.

Accordingly, the components described in the accompanying drawings and the detailed description of the invention include not only components which are required to solve the problem but also components which are not required to solve the problem in order to describe the above exemplary technique. Therefore, it should not be immediately understood that those components which are not required are necessary simply because these components which are not required are described in the accompanying drawings and the detailed description of the invention.

Further, the above exemplary embodiments are the exemplary technique according to the present disclosure, and consequently can be variously changed, replaced, added and omitted in the range of the claims or the range equivalent to the claims.

Notes (Note 1)

An imaging device including:

an optical system;

an imaging sensor which captures a subject image condensed by the optical system;

an assist light source which causes reflected light to be incident on the imaging sensor; and a controller which performs a shooting operation when the controller detects a change of a predetermined level or more in an output signal which the imaging sensor output when the reflected light is incident.

(Note 2)

The imaging device according to note 1, further including a monitor which displays a captured subject image, wherein the monitor is rotatably held by a housing of the imaging device, and the controller performs the shooting operation when a display surface of the monitor is oriented toward a subject.

(Note 3)

The imaging device according to note 2, wherein the controller displays an on-screen display which moves in a center direction of the optical system, on the display surface before start of shooting a still image of a subject or during shooting of a moving image.

(Note 4)

The imaging device according to note 3, wherein the controller performs the shooting operation after the on-screen display which moves in the center direction of the optical system is not displayed on the display surface.

INDUSTRIAL APPLICABILITY

The present disclosure is applicable to an imaging device which has a vari-angle monitor or a monitor oriented toward a subject side. More specifically, the present disclosure is applicable to a digital still camera, a smartphone or the like.

What is claimed is:

1. An imaging device comprising:

an optical system;

an imaging sensor which captures a subject image condensed by the optical system;

a monitor which displays the captured subject image; and a controller which displays an on-screen display, which moves primarily along a path that intersects a center of the optical system, on a display surface of the monitor oriented toward a subject before start of shooting a still image of a subject or during shooting of a moving image.

2. The imaging device according to claim 1, wherein the monitor is rotatably held by a housing of the imaging device, and the controller displays the on-screen display, which moves primarily along the path that intersects the center of the optical system, on the display surface of the monitor when the display surface of the monitor is oriented toward the subject.

3. The imaging device according to claim 1, further comprising an assist light source which causes reflected light to be incident on the imaging sensor, wherein an enter of the reflected light of the assist light source into the imaging sensor prompts the imaging sensor to output an output signal, and the controller performs a shooting operation when detecting a change of a predetermined level or more in the output signal.

4. An imaging device comprising:

an optical system;

an imaging sensor which captures a subject image condensed by the optical system;

a monitor which displays the captured subject image; and a controller which displays an on-screen display, which moves in a center direction of the optical system, on a display surface of the monitor oriented toward a subject before start of shooting a still image of a subject or during shooting of a moving image, wherein the controller performs a shooting operation after the on-screen display which is displayed on the display surface of the monitor and which moves in the center direction of the optical system is not displayed on the display surface.

5. The imaging device according to claim 4, wherein the monitor is rotatably held by a housing of the imaging device, and the controller displays the on-screen display, which moves in the center direction of the optical system, on the display surface of the monitor when the display surface of the monitor is oriented toward the subject.

6. The imaging device according to claim 4, further comprising an assist light source which causes reflected light to be incident on the imaging sensor, wherein an enter of the reflected light of the assist light source into the imaging sensor prompts the imaging sensor to output an output signal, and the controller performs a shooting operation when detecting a change of a predetermined level or more in the output signal.

* * * * *